Nov. 4, 1947.　　　L. HORNBOSTEL　　　2,430,175
STREAM FLOW VALVE ACTUATOR
Filed May 25, 1942　　　2 Sheets-Sheet 2
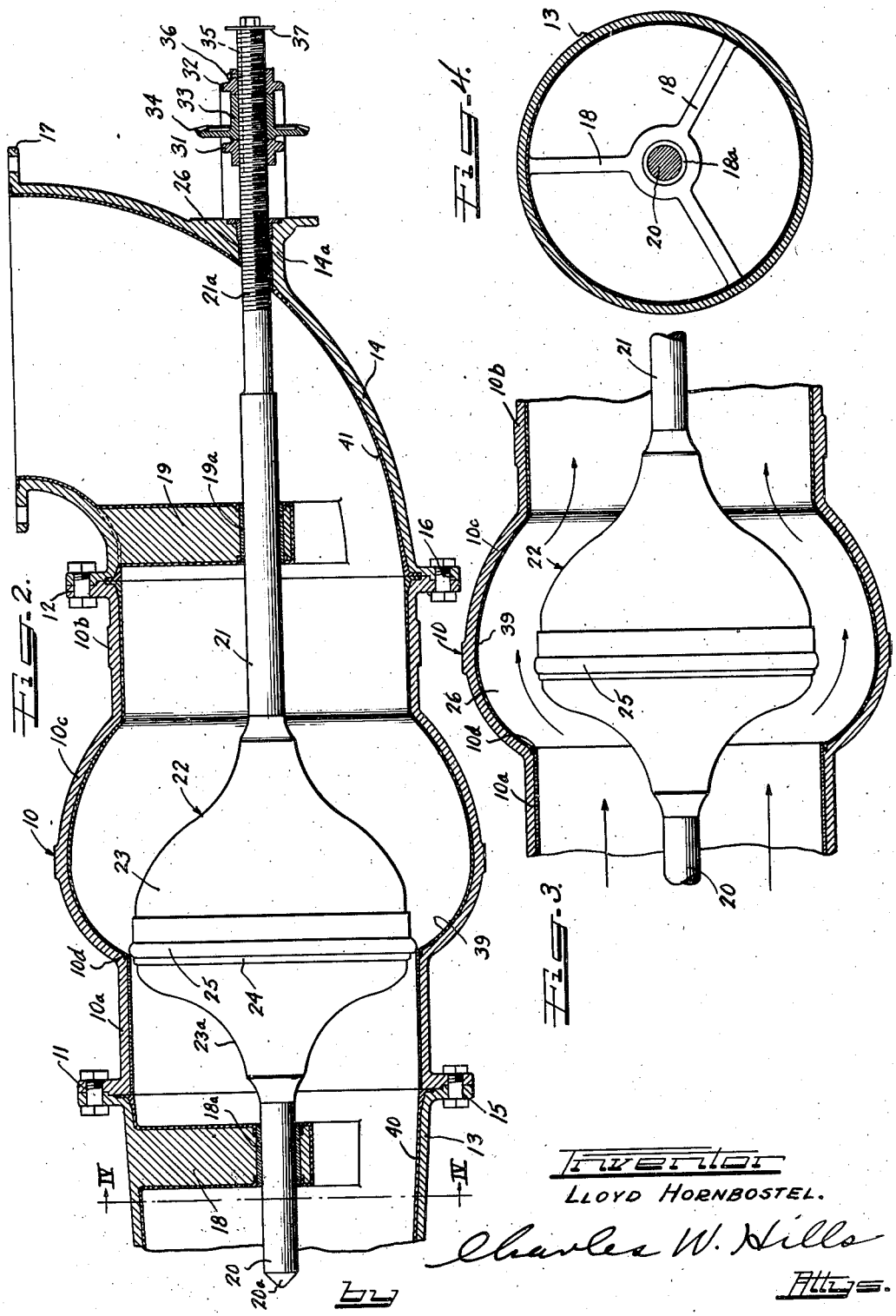

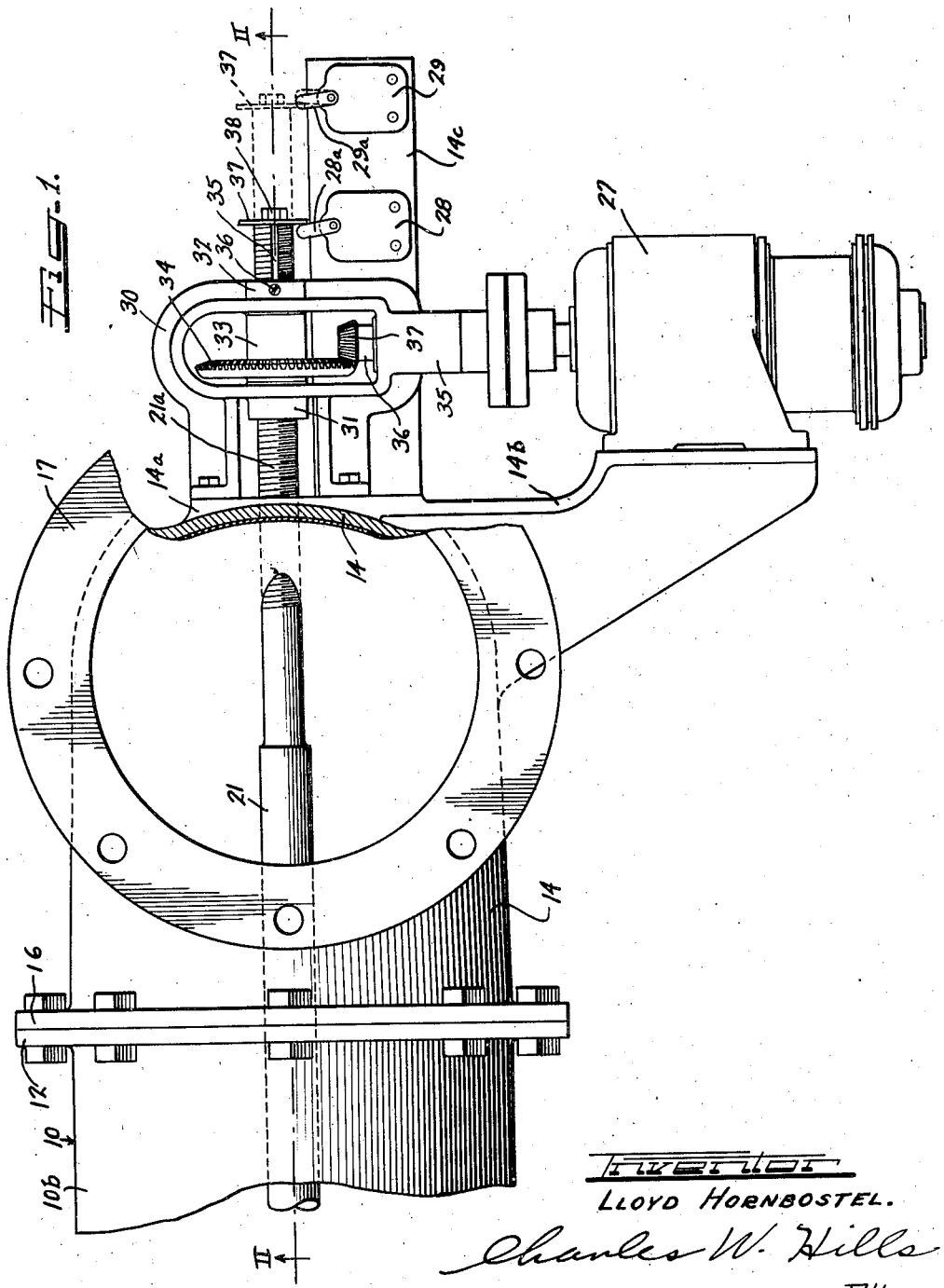

ced by an intermediate hollow bulbous portion 10c.
UNITED STATES PATENT OFFICE 2,430,175

STREAM FLOW VALVE ACTUATOR

Lloyd Hornbostel, Beloit, Wis., assignor to Beloit Iron Works, Beloit, Wis., a corporation of Wisconsin Application May 25, 1942, Serial No. 444,333

2 Claims. (Cl. 192—142)

This invention relates to a valve for controlling the flow of a stream through a conduit without producing eddy currents, "dead" spots, and unevenness in the flowing stream.

Specifically the invention relates to a valve for controlling streams of paper stock, white water, and the like liquid suspensions without setting up a churning action in the stream and without creating pockets where lumps or bundles of the suspended materials can collect.

While the valves of this invention are especially adapted for the control of flowing streams of paper stock and white water which must be handled in a paper mill, and will be hereinafter specifically described in connection with such usage, it should be understood that the valves are capable of controlling the flow of any fluid through a conduit, and that the invention is not limited to any particular use of the valve.

In accordance with this invention, aligned spaced opposed conduits such as pipes are equipped with internal spiders carrying bushings or bearing sleeves at the axial centers of the conduits. A valve casing is interposed between the conduits to connect the same. This casing has a hollow bulbous intermediate portion. A plug preferably streamlined for smooth fluid flow therearound is disposed in the casing and is supported on shafts which are slidably mounted in the bushings or bearings of the conduit carried spiders. The casing has an interior annular valve seat adapted to receive the plug thereagainst so that fluid flow through the casing and between the conduits can be completely stopped. However, when the plug is moved away from the casing seat, an annular passageway is provided between the exterior surface of the plug and the interior surface of the bulbous portion of the casing. This annular passageway is shaped for smooth fluid flow.

One of the conduits is preferably in the form of an elbow and one of the shafts from the plug projects through a wall of the elbow. The projecting end of the shaft is threaded. A gear held against axial movement along the shaft is threaded onto the shaft, and this gear is adapted to be driven for moving the threaded portion into and out of the conduit and thereby moving the plug toward and away from its seat to vary the throttling effect of the valve on fluid flowing through the conduits and casing.

The interiors of the conduits and casing, and the exterior of the plug are preferably covered with an inert material such as rubber so that the assembly can handle corrosive fluids.

It is, then, an object of this invention to provide a valve for controlling flow of fluid through a conduit without interfering with a smooth flow of the fluid.

A further object of the invention is to provide a valve having a longitudinally shiftable plug mounted in the center of a stream flowing through the valve for varying the capacity of a passageway through which the stream must flow and thereby controlling the flow of the stream without disturbing smooth stream flow conditions.

A still further object of the invention is to provide a valve having a stationary casing and a longitudinally shiftable plug in the casing for varying the fluid flow capacity of the casing in accordance with the position of the plug.

Another object of the invention is to provide a stream flow valve for connecting spaced opposed conduits for controlling the flow of fluid between the conduits.

Other and further objects of the invention will be apparent to those skilled in the art from the following detailed descriptions of the annexed sheets of drawings which, by way of preferred example, illustrate one embodiment of the invention.

On the drawings:

Figure 1 is a fragmentary plan view, with parts broken away and shown in cross section, illustrating a portion of a stream flow valve according to this invention.

Figure 2 is a longitudinal cross-sectional view taken along the line II—II of Figure 1 and illustrating the valve assembly of this invention.

Figure 3 is a view similar to Figure 2 but illustrating the valve in opened position.

Figure 4 is a transverse cross-sectional view along the line IV—IV of Figure 2.

As shown on the drawings:

In Figures 1 to 3 inclusive the reference numeral 10 designates generally a valve casing having cylindrical end portions 10a and 10b joined by an intermediate hollow bulbous portion 10c. The cylindrical end portions 10a and 10b have outturned flanges 11 and 12 respectively at their outer ends. Conduits 13 and 14 are connected to the ends of the casing 10 so as to be in full fluid flow communication with the casing. The conduit 13 has an outturned flange 15 bolted to the flange 11 while the conduit 14 has an outturned flange 16 bolted to the flange 12. The conduit 14 is preferably formed as an elbow pipe with another flange 17 at the other end thereof for attachment to a pipe line or other conduit fitting.

The conduits 13 and 14 have internal spiders 18 and 19 respectively adjacent the cylindrical portions 10a and 10b of the casing. These spiders 18 and 19 have hubs 18a and 19a providing bearings for slidably receiving shafts 20 and 21 projecting from the ends of a plug valve 22.

The plug 22 is composed of a body 23 of varying circular cross section and having a leading end 23a tapering into the shaft 20 so as to divide a stream of stock flowing from the conduit 13 into the casing 10 with as little agitation as possible. This leading end 23a flares along a concave diverging path to a cylindrical band 24 having a bead 25 therearound. The body then converges along a tear-drop shaped path to the shaft 21.

The bulbous portion 10c of the casing is larger than the body 23 of the plug so as to provide an annular passageway 26 around the plug joining the cylindrical ends 10a and 10b of the casing as best shown in Figure 3. However, the bead portion 25 of the plug is adapted to seat against an annular seat provided at the junction point between the cylindrical portion 10a and the bulbous portion 10c of the casing as shown in Figure 2, thereby sealing the flow of liquid between the conduits 13 and 14. An internal annular seat 10d is thus provided for the bead 25 on the plug.

As shown in Figures 1 and 2, the shaft 21 has a threaded end portion 21a projecting through the wall of the elbow 14. A packing boss 14a can be integrally formed on the elbow to house packing material 26 for preventing leakage out of the elbow around the threaded portion 21a. This boss can have a leg portion 14b as shown in Figure 1 extending therefrom and from the elbow to provide a support for an electric motor 27. Another leg portion 14c extends from the boss 14a for supporting limit switches 28 and 29 thereon.

A gear support 30 is bolted onto the boss 14a and has spaced boss portions 31 and 32 receiving the shaft end 21a freely therethrough. A sleeve 33 is threaded on the shaft end 21a between the bosses 31 and 32 and a bevel gear 34 is integral with or affixed to this sleeve portion. The support 30 also has an end boss 35 receiving a drive shaft 36 from the motor 27. A bevel gear 37 is secured on the end of the shaft and meshes with the gear 34.

A keyway 35 is cut in the threaded end 21a of the shaft 21 and extends inwardly from the free end of the shaft for an appreciable distance as shown in dotted lines in Figure 2. The boss 32 of the gear support 30 has a pin 36 projecting into the keyway 35 so that the shaft 21 is held against rotation but can move in an axial direction.

A washer or collar disk 37 is bolted onto the free end of the shaft by means of a bolt 38 tapped axially into the shaft end. This collar or washer 37 is in the path of the operating levers 28a and 29a of the limit switches 28 and 29.

The motor 27 is preferably a reversible motor or a reversing gear assembly (not shown) can be included in the drive to the shaft 36. When the motor 27 is driven in one direction the sleeve 33 will be rotated and by virtue of its screw thread relation with the shaft portion 21a, the plug will be shifted longitudinally in one direction. If the motor has been driven in a direction, for example, to shift the plug to closed position, the motor will continue to operate until the collar 36 strikes the lever 28a of the limit switch whereupon the motor will stop. The valve will then be in fully closed position as shown in Figure 2. If the motor is reversed the reverse rotation of the sleeve 33 will effect shifting of the plug to open position as shown in Figure 3 and, when the collar 37 strikes against the operating lever 29a of the limit switch 29 as shown in dotted lines in Figure 1, the motor will again stop and the valve will be in fully opened position.

The motor or other prime mover of course can be operated to stop the plug at any intermediate position between fully opened and fully closed positions so as to throttle the flow of liquid through the casing. It will be noted from Figures 2 and 3 that, as the beaded portion 25 of the plug moves away from the valve seat 10b, the flow capacity of the passageway 26 decreases because a portion of the passageway through which the stock must flow will have a decreased area.

The entire interior of the casing 10 can be lined with a rubber lining 39. This lining 39 can be vulcanized to the metal casing and will protect the casing against corrosion. The valve seat 10d can therefore be a rubber seat. Likewise, the interior surfaces of the conduits 13 and 14 including the exterior surfaces of the spiders of these conduits can be lined with and covered with rubber 40 and 41 respectively.

The free end of the shaft 20, as shown in Figure 2, can be tapered to a point 20a so as to pierce the stream and start the dividing action of the stream in order that the same will smoothly flow around the plug 22.

As shown in Figure 4, the spider 18 has relatively thin legs so as to decrease any eddy current effect produced by obstructions in a flowing stream. The legs of the spider 19 may be similarly formed.

From the above descriptions it will therefore be understood that the valve of this invention includes a longitudinally shiftable plug mounted in a casing in such a manner as to define, with the casing, a passageway for the smooth flow of liquids around the plug and through the casing. The plug can be shifted to engage an interior valve seat in the casing for closing the valve.

The shifting mechanism for the plug includes a driving device for rotation of a sleeve which is threaded onto a supporting shaft for the plug. While two supporting shafts have been described it is obvious that a single shaft can project through the plug body 23 so as to slide through both spider bearings 18a and 19a.

The mechanism for shifting the plug in the casing includes a device which will prevent rotation of the plug.

It will, of course, be understood that various details of the invention may be varied through a wide range without departing from the principles of this invention and it is, therefore, not the purpose to limit the patent granted hereon otherwise than necessitated by the scope of the appended claims.

I claim as my invention:

1. In a valve construction, a casing with an elbow portion, a valve-actuating shaft extending through a wall of the elbow portion, a gear threaded on said shaft, a yoke support carried by said elbow portion receiving the shaft therethrough and providing thrust surfaces for holding the gear against axial movement on the shaft, a key between the support and shaft for holding the shaft against rotation, reversible means for driving said gear to non-rotatably move the shaft in opposite axial directions, and a pair of spaced limit switches in the path of axial movement of said shaft for stopping said reversible means whenever the shaft reaches predetermined positions.

2. In a valve construction, a casing member having an elbow portion, a valve-actuating shaft slidably mounted in said elbow portion and having a threaded end projecting through the elbow portion, a support mounted on said elbow receiving a threaded portion of the shaft freely therethrough, a sleeve threaded on said shaft and held against axial movement by said support, key and slot means between the support and shaft for holding the shaft against rotation, a reversible driving motor mounted on said support, a gear on said sleeve, a pinion driven by said motor meshing with said gear whereby said shaft is moved axially by said motor, laterally projecting means fixedly mounted on the end of said shaft, and a pair of toggle switches mounted on said support having spaced switch arms adapted to be selectively operated by said laterally extending means on said shaft as said shaft moves axially, said switches controlling said motor to automatically limit the extent of movement of said shaft.

LLOYD HORNBOSTEL.

REFERENCES CITED

The following references are of record in the file of this patent:

UNITED STATES PATENTS

| Number | Name | Date |
| --- | --- | --- |
| Re. 20,471 | Kelty | Aug. 17, 1937 |
| 531,985 | Wagner | Jan. 1, 1895 |
| 679,518 | Skirrow | July 30, 1901 |
| 887,253 | Jackson | May 12, 1908 |
| 932,028 | Koenig | Aug. 24, 1909 |
| 1,018,127 | Olson | Feb. 20, 1912 |
| 1,290,722 | Doble | Jan. 7, 1919 |
| 1,508,138 | Foote | Sept. 9, 1924 |
| 1,567,995 | Kimball | Dec. 29, 1925 |
| 1,822,970 | Johnson | Sept. 15, 1931 |
| 2,247,562 | Santen | July 1, 1941 |
| 2,318,814 | Strong | May 11, 1943 |
| 2,366,739 | McCoy | Jan. 9, 1945 |

FOREIGN PATENTS

| Number | Country | Date |
| --- | --- | --- |
| 62,832 | Australia | 1914 |